No. 646,523. Patented Apr. 3, 1900.
G. A. & R. F. DUNN.
SPRAYING APPARATUS.
(Application filed July 17, 1899.)
(No Model.)
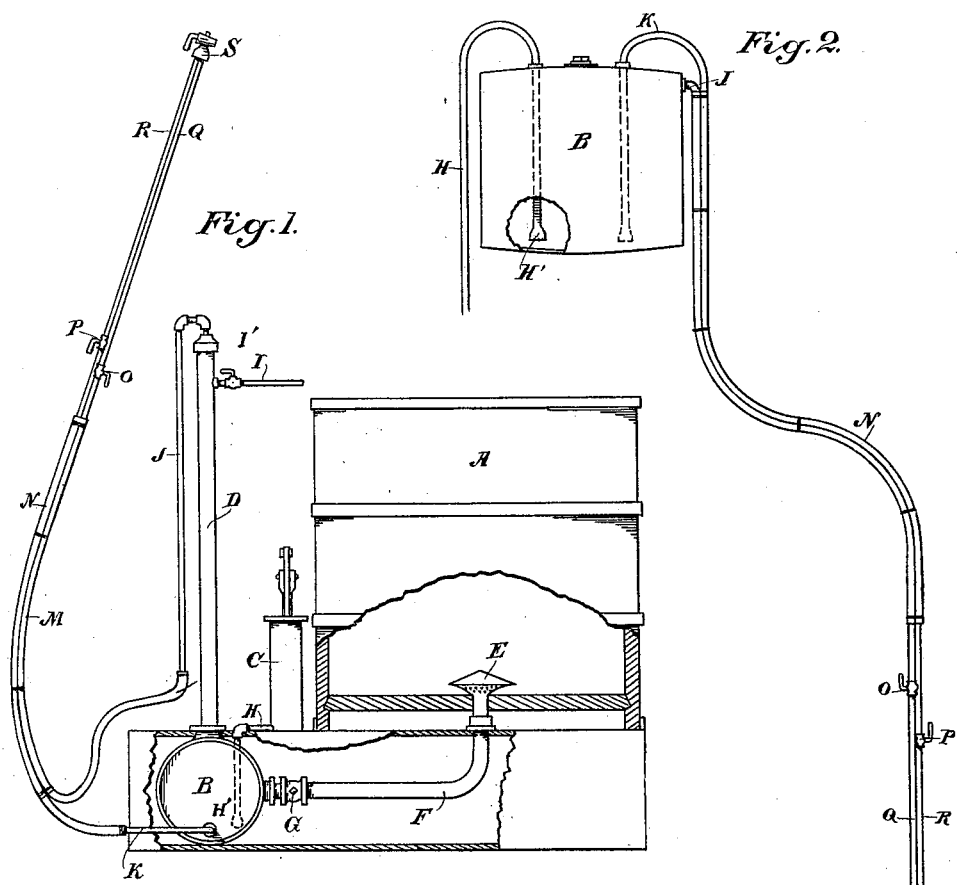
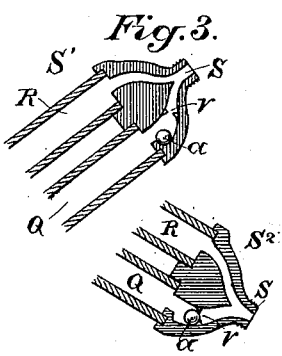
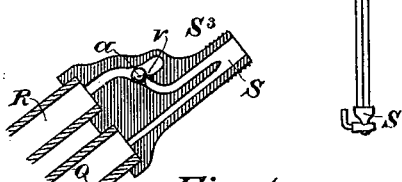
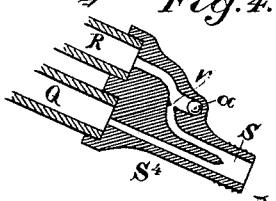
Witnesses,
Inventors,
George A. Dunn
Robert F. Dunn

UNITED STATES PATENT OFFICE.

GEORGE AMBROSE DUNN AND ROBERT FRANKLIN DUNN, OF DINUBA, CALIFORNIA.

SPRAYING APPARATUS.

SPECIFICATION forming part of Letters Patent No. 646,523, dated April 3, 1900.

Application filed July 17, 1899. Serial No. 724,070. (No model.)

*To all whom it may concern:*

Be it known that we, GEORGE AMBROSE DUNN, a citizen of Canada, and ROBERT FRANKLIN DUNN, a citizen of the United States, both residing at Dinuba, county of Tulare, State of California, have invented an Improvement in Spraying Apparatus; and we hereby declare the following to be a full, clear, and exact description of the same.

Our invention relates to an apparatus which is especially designed for spraying fruit-trees, plants, and other like purposes.

It consists of a main containing-reservoir, a supplemental closed chamber, with connections by which liquid is delivered from the first to the second chambers, an air-pumping mechanism connecting with the closed chamber and through it discharging air into the main chamber, independent liquid and air conveying pipes lashed together, a nozzle common to both, with automatic discharge-regulating valve for either liquid or air, and means for agitating the liquid to keep it thoroughly mixed before being discharged.

The invention also comprises details of construction, which will be more fully explained by reference to the accompanying drawings, in which—

Figure 1 is an elevation of the apparatus. Fig. 2 shows our improvement applied to a "knapsack" apparatus. Fig. 3 shows the valve in the nozzle for the air-passage. Fig. 4 is a similar view showing the valve in the liquid-passage.

A is the containing-reservoir, into which the liquid and any substance to be mixed with it are placed. B is a second chamber, which is made tight, so that some pressure of air can be forced into it. The two chambers are mounted upon any suitable supporting stand or platform with the closed chamber B sufficiently lower than the chamber A to allow liquid to pass from A to B by gravitation through connecting-pipe F.

G is a cock or valve controlling the passage between the two chambers.

The end of the pipe which opens into the lower part of the reservoir A is expanded and has a cap upon the top, and underneath this cap the bell-shaped expanded end is perforated with holes, as shown at E, for a purpose to be hereinafter described.

C is an air-pump of any description, and H is a pipe leading from the air-pump into the receiver B. This receiver, as shown in Fig. 1, is stationary, being designed for a large apparatus; but a receiver of similar nature may be designed to be carried upon the back of a person and is known as the "knapsack" apparatus. The connecting air-pipe may be made flexible where it enters the chamber B, extending downwardly from the upper part to near the bottom, weighted, as shown at H', so that it will hang with the lower and discharge end near the bottom of the chamber B. The pipe K is so connected that its mouth or inlet is near the bottom of the chamber B, and it connects with a flexible tube N, leading to a nozzle S.

In the stationary apparatus as shown in Fig. 1 we have shown a vertical stand-pipe D extending upwardly from the top of the chamber B and having a discharge-pipe I, with a controlling-cock near the upper end. An air-pipe J connects with the top of this pipe D, and from it a flexible hose M, which also extends to and connects with the nozzle S. These tubes are connected together, the liquid-tube having a regulating-cock P and the air-tube a similar cock O. The nozzle S has two passages made in it, one receiving the liquid and the other receiving air. These two passages converge and unite at the discharge end of the nozzle, as shown. Within the nozzle and adapted to control either the liquid or the air passage, or both, is a metal ball-valve $a$, and the passages in the nozzle are so chambered that the ball may be entirely removed from the passage which it controls, thus allowing a free flow of either air or liquid, or it may be seated upon a ribbed seat, as shown at V, which partially checks the flow of the air or liquid which the valve controls. As shown at S', when the nozzle is pointed upward the valve $a$ rests in the pocket in the lower side of the passage through which the air passes, thus allowing the air to flow freely without hindrance through the discharge-passage. If the nozzle is turned downward, as shown at $S^2$, the ball will roll down upon the seat V and will thus partially check the flow of air, but will allow the liquid to flow freely. As shown at S⁴, the valve a, which controls the liquid discharge, is within a pocket, which takes it out of the liquid-passage, and, the nozzle being pointed or inclined downwardly, the liquid will be free to pass through the discharge. When turned as shown at S¹, with the nozzle pointing upwardly, the valve which controls the liquid-passage drops into the line of discharge of the liquid and, resting against the ribbed seat, reduces the amount of liquid which is discharged with the air. By this construction the ball-valve becomes an auxiliary to the governing-cocks O and P and is especially useful when the change of position of the nozzle is required. Thus when the nozzle is held so as to discharge downwardly the flow of liquid is much greater and must be controlled either by shutting off the flow of a portion of the liquid or by increasing the flow of air.

The operation will then be as follows: The tank or reservoir A is filled with the spraying liquid and the governing-cocks G and I' are opened. The opening of the cock I' allows the air to escape from the closed chamber B, and the liquid will flow through the pipe F and the cock G and will fill the chamber B. Afterward the cocks G and I' are closed. The pump is then operated, and the air being forced into the chamber B will agitate the liquid as it passes through it in its course upward into the pipe D. Sufficient internal pressure being produced, the air is allowed to pass through the pipe J and the hose M and the liquid through the pipe K and the hose N to the point S, where the two meet and are discharged through the single nozzle or passage in the form of a spray, the character of which will be determined by the air-pressure and also by the proportionate amount of air and liquid which is being discharged. When the liquid has been exhausted from the chamber B, the controlling-cock G is opened and the air remaining compressed in the chamber B will escape into the reservoir A with sufficient force to agitate the liquid therein. The bell-shaped and perforated mouth E of the pipe F within the chamber A has the effect of discharging the air downwardly and outwardly, so that any heavy sediment within the reservoir A will be thoroughly agitated and stirred up, so that the liquid is in condition to be again drawn into the chamber B, which is done after the force of the air is spent by again opening the air-escape cock I' of the stand-pipe D until the chamber B is filled with liquid and the work thus continued.

It will be manifest that the arrangement of pipes shown in what is termed the "knapsack" apparatus is similar to that shown in Fig. 1; but the tubes may, either one or both of them, be allowed to swing freely by reason of their flexible character, so that the passage of the air and liquid through these tubes will act to agitate the liquid in the receiver.

This device can be used as either a high or low pressure spraying apparatus by varying the air and liquid pressure and discharge.

The ball-valve arrangement assists in giving a uniform spray and the auxiliary close-chamber B obviates the necessity of a large and expensive air-tight receiver.

Having thus described our invention, what we claim as new, and desire to secure by Letters Patent, is—

1. The combination of a main reservoir, a supplemental closed chamber with connecting-pipe through which the liquid can flow by gravity, an air-pump connecting therewith and liquid and air discharge pipes leading from the top and bottom of said chamber respectively, said pipes being united and discharging through a common delivery-nozzle.

2. A main reservoir, a supplemental tight chamber with pipe through which liquid may flow from the main to the supplemental reservoir, an air-pump with pipe connecting it with the supplemental reservoir, a bell-shaped perforated nozzle upon the end of the connecting-pipe within the main reservoir and a cock through which air may be discharged from the supplemental to the main chamber through said perforated cap or liquid delivered from the main to the supplemental chamber when the air-pressure is exhausted.

3. A main reservoir, a supplemental closed chamber, a pipe having a perforated bell-cap within the main chamber, said pipe connecting with the supplemental chamber and having a controlling-cock, an air-pump with pipe connecting it with the supplemental chamber, a stand-pipe from the upper part of said chamber with an air-escape passage and controlling-cock by which liquid is allowed to flow from the main to supplemental chambers, said cocks being closed when the supplemental chamber is full so that a pressure of air may be accumulated within the supplemental chamber, a liquid-pipe connecting with the lower part of said chamber and an air-pipe connecting with the upper part of the stand-pipe, valves by which the flow through said pipes is controlled, and a common discharge-nozzle with which the two pipes are connected.

4. An apparatus comprising main and supplemental chambers, air-pump, connecting-pipes and controlling-cocks, separate air and liquid discharge pipes secured together, a nozzle having independent liquid and air passages, said passages uniting at the discharge end of the nozzle, a ball freely movable in one of said passages, a seat against which the ball falls to partially close the exit when the nozzle is held in one direction, and a pocket into which the ball passes to leave a free passage through the nozzle when the latter is held in the opposite direction.

5. In a spraying apparatus, a main mixing-chamber, a supplemental chamber with a pipe connecting the two, an air-pump with pipe connecting it with the supplemental closed chamber, a cock controlling the passage between the two chambers and a bell-shaped end upon the pipe where it enters the lower part of the main chamber, said end being perforated so as to discharge air under pressure downward and outward within the liquid contained in said chamber.

6. A main and a supplemental reservoir with a connecting-pipe, a liquid-discharge pipe from the bottom and an air-discharge pipe from the top of the supplemental reservoir, an air-pump and a pipe leading therefrom to the bottom of the supplemental reservoir, said pipe having a flexible swinging section interior to the reservoir.

In witness whereof we have hereunto set our hands.

GEORGE AMBROSE DUNN.
ROBERT FRANKLIN DUNN.

Witnesses:
W. P. BOONE,
F. T. ELAM.